United States Patent
Cameron

(10) Patent No.: US 6,372,874 B1
(45) Date of Patent: Apr. 16, 2002

(54) PROCESS FOR THE PREPARATION OF SILOXANE-OXYALKYLENE COPOLYMERS

(75) Inventor: Rudolph A. Cameron, Vienna, WV (US)

(73) Assignee: Crompton Corporation, Greenwich, CT (US)

( * ) Notice: Subject to any disclaimer, the term of this patent is extended or adjusted under 35 U.S.C. 154(b) by 0 days.

(21) Appl. No.: 09/205,083

(22) Filed: Dec. 4, 1998

(51) Int. Cl.$^7$ .......................... C08G 77/08; C08G 77/46
(52) U.S. Cl. ........................... 528/21; 528/15; 528/31; 528/33
(58) Field of Search ................. 528/15, 21, 31, 528/33

(56) References Cited

U.S. PATENT DOCUMENTS

| | | |
|---|---|---|
| 3,280,160 A | 10/1966 | Bailey |
| 3,402,192 A | 9/1968 | Haluska |
| 3,518,288 A | 6/1970 | Haluska |
| 3,980,688 A | 9/1976 | Litteral |
| 4,122,029 A | 10/1978 | Gee |
| 4,292,434 A | 9/1981 | Lindner |
| 4,417,068 A | 11/1983 | Kollmeier |
| 4,431,789 A | 2/1984 | Okazaki |
| 4,515,979 A | 5/1985 | Otsuki |
| 4,520,160 A | 5/1985 | Brown |
| 4,801,642 A | 1/1989 | Janik |
| 4,847,398 A | 7/1989 | Mehta |
| 4,857,583 A | 8/1989 | Austin |
| 4,978,705 A | 12/1990 | Lamont |
| 5,153,293 A | 10/1992 | Hales |
| 5,159,096 A | 10/1992 | Austin |
| 5,191,103 A | 3/1993 | Mehta |
| 5,380,812 A | 1/1995 | Lutz et al. |
| 5,430,097 A * | 7/1995 | Petroff et al. .................. 528/31 |
| 5,527,855 A | 6/1996 | Petroff |
| 5,648,444 A | 7/1997 | Austin |
| 5,811,487 A * | 9/1998 | Schulz et al. .................. 528/15 |
| 5,902,870 A * | 5/1999 | Isoyama et al. ............... 528/15 |

FOREIGN PATENT DOCUMENTS

| | | |
|---|---|---|
| GB | 1054658 | 2/1964 |
| GB | 1293331 | 1/1970 |

* cited by examiner

Primary Examiner—Robert Dawson
Assistant Examiner—Jeffrey B. Robertson
(74) Attorney, Agent, or Firm—Shirley S. Ma

(57) ABSTRACT

This invention disclosure describes an improved process for the preparation of siloxane-oxyalkylene copolymers via hydrosilation of unsaturated polyethers with organohydrogensiloxanes in the presence of hydroxyl, carbonyl, or ether-functional amines as buffer-catalyst modifiers for noble metal hydrosilation catalysts. The common side reactions such as dehydrocondensation and acetal formation are significantly reduced or eliminated, by the use of these amines, without reduction in hydrosilation rates.

7 Claims, No Drawings

PROCESS FOR THE PREPARATION OF SILOXANE-OXYALKYLENE COPOLYMERS

FIELD OF THE INVENTION

The present invention relates to the production of siloxane-polyoxyalkylene copolymers, referred to herein as "Copolymers".

BACKGROUND OF THE INVENTION

The use of platinum catalysts for the addition of silanes or siloxanes with SiH groups to compounds with one or more olefinic double bonds, a reaction commonly referred to as hydrosilation or hydrosilylation, is well known. The addition reaction, however, proceeds without an appreciable formation of by-products, only if the compounds that have the olefinic double bond are free of groups which can react with the SiH group in competition with the addition reaction. This includes particularly the carbon-linked hydroxyl group. In practice it frequently happens that the hydrosiloxanes or hydrosilanes must be added to compounds with olefinic unsaturations, which also have hydroxyl groups or other reactive groups. An example of such a reaction is the addition of hydrosiloxane to an unsaturated alcohol or polyether. There is thus, a need for an economical process which, on one hand, has a high activity to the addition of the SiH group to the olefinic double bond, and on the other hand, minimizes the side reactions.

Besides the aforementioned competing reaction in the form of the reaction of the SiH and COH groups, it is desired to also avoid disproportionation reactions within the silane or siloxane compounds. Such disproportionation reactions are understood to include a redistribution of the SiH groups, which are usually present in the mixture of silanes or siloxanes. Further side reactions or secondary reactions are the conversion of the allyl groups to propenyl groups, or the possible crosslinking of the addition compound that has terminal OH groups, via acetal formation with the propenyl ether groups. Both reactions generally are catalyzed by chloroplatinic acid ($H_2PtCl_6 \cdot 6H_2O$), and lead, on the one hand, to an inadequate conversion of the SiH groups and on the other hand, to an increase in viscosity of the end product.

The introduction of carboxylate salts of alkali and alkali earth metals—sodium propionate in particular—and solventless processing, have significantly improved the efficiency of copolymer production, as well as drastically cut batch cycle times. The use of sodium propionate often leads to the need for multiple catalysis or requirements of greater initial catalyst charge. Consistent with a longer induction period is greater selectivity to copolymers that are of the higher molecular weight analogs, which often give lower cloud points and reduced water solubility. Sodium propionate for the most part, is relatively insoluble in the reactants as well as the generated copolymers, and must be removed by post hydrosilation filtration. Sodium propionate in the presence of water, catalyzes dehydrocondensation potentially liberating hydrogen gas.

The use of sodium phosphate salts as buffers in solventless processes, have shown some improvement over sodium propionate. There is no detected inhibition in the rates of hydrosilation, and the resulting copolymers give water solubility and cloud points, that are comparable to those given by copolymers made in toluene. Sodium phosphate salts however, are very polar and dense, thus are hard to disperse throughout the reactant mixture. Settling is prone to occur, which severely limits their effectiveness.

U.S. Pat. No. 4,847,398 describes a process for the preparation of siloxane-oxyalkylene copolymers via a solventless hydrosilation in the presence of carboxylic acid salts. Although side reactions such as dehydrocondensation and acetal formation were much reduced by the use of these carboxylic acid salts, the rates of the hydrosilation reactions were somewhat inhibited, with the resulting Copolymers consisting of higher molecular weight analogs. This is evident in the relatively lower water solubilities that are characteristics of these copolymers.

U.S. Pat. No. 5,191,103 teaches the use of sterically hindered, nitrogen-containing and phosphorus-containing compounds as buffer-catalyst modifiers in the preparation of Copolymers. These amines and phosphines work to reduce dehydrocondensation and acetal formation and are often solids or high boiling liquids, which must either be removed by post hydrosilation filtration, or be allowed to remain in the resulting copolymer. As these compounds may be basic and cannot be removed by stripping, post hydrosilation neutralization is necessary in order to obtain a pH neutral copolymer. This need for additional processing lengthens the overall batch cycle time of the copolymer production, particularly where the buffer-catalyst modifier is solid, and limits their utilization in cosmetics and personal care applications, where the buffer-catalyst modifier is a high boiling liquid.

Separately, U.S. Pat. No. 4,292,434 teaches the use of a platinum catalyst that is specially modified, firstly by reaction with an olefin, and further with a primary or secondary amine. The need for pre-formation of the catalyst complex, prior to the hydrosilation, adds much additional expense, as well as lengthening the process time for the copolymer. Moreover, the catalyst package is more ideally suited for reactions involving monomeric or dimeric silicon compounds as opposed to polymeric silicones of the present invention.

SUMMARY

This invention disclosure describes an improved process for the preparation of Copolymers via a solventless hydrosilation of oxyethylene-rich polyethers in the presence of an ether, hydroxy or carbonyl modified amine as a buffer-catalyst modifier. The common side reactions such as dehydrocondensation and acetal formation are significantly reduced or eliminated, by the use of these amines. Undesirable side reactions such as acetal formations and dehydrocondensation are reduced or eliminated, when these amines are combined with the reactants. They are liquids at ambient temperature with boiling points ranging from 70° C. to 220° C. They are also completely miscible with the polyether-siloxane fluid admixture, thus are easily dispersed, without the risk of sedimentation. Rates of hydrosilation are minimally or not at all affected by these amines, thus there is virtually no induction period, and the resulting copolymers give comparable water solubility characteristics to those made in solvents. Since the amines have relatively low boiling points, optional removal by post hydrosilation stripping is possible, for Copolymers whose end-use is in cosmetics and or personal care applications. These amines unlike sodium propionate, do not catalyze the undesirable dehydrocondensation side reaction. When amines of the invention, are utilized, reduced levels of noble metal catalyst are possible during the hydrosilation, and the resulting copolymers possess water solubility characteristics that are equivalent to those of Copolymers prepared in solvent.

DETAILED DESCRIPTION OF THE INVENTION

The present invention is directed to an improved process for the preparation of Copolymers, and to products obtained by this process. These Copolymers are prepared by a hydrosilation reaction between (i) an organohydrogenpolysiloxane and (ii) at least one unsaturated polyoxyalkylene, in the presence of (iii) a modifier, which is a primary, secondary or tertiary amine with an alkyl group having a hydroxyl, ether, or carbonyl functionality and a boiling point below 220° C., preferably between 70° C. and 200° C., and more preferably 95° C. to 180° C. and (iv) a noble metal hydrosilation catalyst. The amine is believed to act as a buffer-catalyst modifier. The reaction is carried out in the presence of, or more preferably, in the absence of a solvent. Benefits include the elimination of need for post hydrosilation pH adjustments and filtration and extended solvent stripping, as well as improved per batch yields and significant reduction in batch cycle times. Reduced noble metal catalyst usage and the production of Copolymers that consistently give improved water solubility are achieved. A wider utilization of these copolymers in cosmetic, personal care and textile applications is another benefit, as well as the production of Copolymers that exhibit reduced polydispersity in their molecular weight distributions, i.e., relative to the product made without such an amine a decrease of at least 45% in $M_w/M_n$ polydispersity ratio (as measured by gel permeation chromatography(gpc)). Tighter molecular weight distributions will also provide benefits in applications such as polyurethane foam, coatings, agricultural formulations and antifoam compositions.

A preferred embodiment of the process is as follows:
1). forming a mixture of:
(i) an organohydrogensiloxane having the unit formula: $[R_aH_bSiO_{(4-a-b)/2}]n$ wherein R denotes a monovalent hydrocarbon radical free of aliphatic unsaturation and has 1 to 8 carbon atoms, a has an average value of 1 to 3, b has an average value of 0.01 to 1.5, the sum of a+b has an average value of 1 to 3, and n denotes the number of siloxane units, having a value of 2 to 200, and
(ii) at least one polyoxyalkylene having the average formula

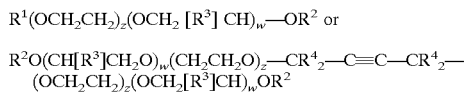

wherein $R^1$ denotes an aliphatically unsaturated hydrocarbon group containing from 2 to 10 carbon atoms, $R^2$ is $R^1$, hydrogen, an alkyl group containing 1 to 8 carbon atoms, an acyl group containing 2 to 8 carbon atoms, or a trialkylsilyl group. $R^3$ is a monovalent hydrocarbon group containing 1 to 18 carbon atoms. $R^4$ is $R^3$ or hydrogen, z has a value of 0 to 100 and w has a value of 0 to 80, and
(iii) at least one amine having an alkyl group with hydroxyl, carbonyl, or ether functionality, which has a boiling point below 220° C. at atmospheric pressure, and
2) adjusting and maintaining the temperature of the mixture to promote the reaction of the organohydrogensiloxane with the polyoxyalkylene, and
3). providing to said mixture, a catalytically effective amount of a noble metal hydrosilation catalyst, and
4). maintaining the temperature of said mixture below 120° C. to reaction completion, and
5). recovering said copolymer.

Undesirable side reactions such as acetal formation and dehydrocondensation are reduced or eliminated, when these amines are utilized in the hydrosilations. The amines are liquids and are very miscible with the polyether-siloxane premix, thus are easily dispersed, without the risk of sedimentation. They have relatively low boiling points, thus are removable from the copolymer after the hydrosilation is completed. Since the amines have relatively low boiling points, optional removal by post hydrosilation stripping is possible, for copolymers whose end use is in cosmetics and or personal care applications.

The term "solventless" means that no added solvent, volatile or otherwise, is employed in the hydrosilation reaction of the organohydrosiloxane and the polyoxyalkylene. Any small amount of other liquids which might be introduced with, for example, the catalyst, is incidental and is not considered to be a reaction solvent.

Organohydrosiloxanes

Organohydrogensiloxane compounds useful in the present invention for the preparation of the surfactants include those represented by the formula:

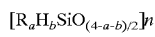

wherein R denotes a monovalent hydrocarbon radical free of aliphatic unsaturation and has 1 to 8 carbon atoms, a has an average value of 1 to 3, b has an average value of 0.01 to 1.5, the sum of a+b has an average value of 1 to 3, and n denotes the number of siloxane units, having a value of 2 to 200.

The organohydrogensiloxane can contain any combination of siloxane units selected from the group consisting of $R_3SiO_{1/2}$, $R_2HSiO_{1/2}$, $R_2SiO_{2/2}$, $RHSiO_{2/2}$, $RH_2SiO_{1/2}$, $RSiO_{3/2}$, $HSiO_{3/2}$ and $SiO_{4/2}$ provided that the organohydrogensiloxane contains sufficient R-containing siloxane to provide from 1 to 3 R radicals per silicon atom and sufficient H-containing siloxane units to provide from 0.01 to 1.5 silicon-bonded hydrogen atoms per silicon and a total of R radicals and silicon-bonded hydrogen atoms of from 1 to 3 per silicon.

The preparation of organohydrosiloxanes is well known, and is set forth, for example, in *The Chemistry and Technology of Silicones,* Noll W., Academic Press (New York): 1968, Chapter 5 p. 191–246. Illustrative of suitable radicals are alkyl radicals such as methyl, ethyl, propyl, butyl, tolyl, xylyl, and substituted hydrocarbons groups such as heptafluoropropyl. R is preferably methyl.

Polyethers

Unsaturated polyoxyalkylene reactants, which can be employed in the process of this invention, include those having the formula:

wherein $R^1$ denotes an unsaturated organic group containing from 2 to 10 carbon atoms such as vinyl, allyl, methallyl, propargyl or pentynyl. When the unsaturation is olefinic, it is desirably terminal to facilitate complete hydrosilation. $R^2$ is $R^1$, hydrogen, an alkyl group containing 1 to 8 carbon atoms, an acyl group containing from 2 to 8 carbon atoms, or a trialkylsilyl group. $R^3$ and $R^4$ are monovalent hydrocarbon groups containing 1 to 18 carbon atoms. $R^4$ may also be hydrogen. Methyl is the most preferred $R^3$ group. Z has a value of 0 to 100 and w has a value of 0 to 80. Preferred values of z and w are 1 to 50 inclusive. The unsaturated polyether, whether comprised of alkyne groups or terminal olefinic groups, may be a blocked or a randomly distributed copolymer of differing oxyalkylene units.

Amines

The buffer-catalyst modifier is a a relatively volatile liquid amine, which allows for easy removal by post hydrosilation stripping. The amine should contain either an ether, hydroxyl or carbonyl functionality, preferably hydroxyl. Preferably, the amine is secondary or tertiary. The amine component should have a boiling point below 220° C. at atmospheric pressure, and preferably between 95 and 180° C. The amines are less polar than salts and are completely miscible with the polyoxyalkylene-siloxane premix, thus the chance of sedimentation is nonexistent.

The amines useful in this invention include those having the general formula:

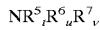

$R^5$ is H, an alkyl group of 1 to 8 carbon atoms, an aryl group of 6 to 10 carbon atoms, an alkenyl group of 3 to 8 carbon atoms, t is 0, 1, or 2, $R^6$ is $R^5$, being the same or different, u is 0, 1, or 2, $R^7$ is an alkyl group of 2–10 carbon atoms having hydroxyl, ether or carbonyl functionality, v is 1, and t+u=2. Examples of preferred amines are (N,N-dimethylamino)-2-propanol (DMAP), (N,N-diethylamino)-2-propanol (DEAP), 5-(N,N-diethylamino)-2-pentanol (5DEAP), 2-(N,N-diethylamino) ethanol vinyl ether, Methy 3-(N,N-dimethylamino)propionate, (N,N-dimethylamino) acetone, 2-(N-methylamino)ethanol, 2-(N-propylamino) ethanol, 1-amino-2-propanol, diethylamino-3-butanone, and 2-amino-1-butanol.

The amine component added in accordance with the present invention should comprise about 0.01 to 0.5% by weight of the total reaction charge. The amine also may be combined with the noble metal catalyst, prior to its addition to the siloxane-oxyalkylene polyether admixture.

Hydrosilation

The hydrosilation reaction is conducted in the presence of an effective amount of a noble metal hydrosilation catalyst. Such well-known catalysts include platinum, palladium and rhodium containing complexes. They are reviewed in the compendium, *Comprehensive Handbook on Hydrosilation*, edited by B. Marciniec and published by Pergamon Press, NY 1992. Chloroplatinic acid and platinum complexes of 1,3-divinyltetramethyldisiloxane particularly are preferred. The catalyst need not be pre-contacted with an olefin prior to its use, but may be added directly to the reaction system. The amine and the catalyst may be pre-contacted and fed to the reaction system together.

The catalyst is employed in an effective amount sufficient to initiate, sustain and complete the hydrosilation. The amount is usually within the range of 1 to 100 parts per million (ppm), based on the total parts of the mixture of reactants.

The amount of polyether added should be at least stoichiometrically equivalent to the amount of organohydrosiloxane, taking into account the number of reactive H sites on the organohydrosiloxane. However, it is customary to employ a stoichiometric excess of polyether, on the order of 110% to 130% of the stoichiometrically equivalent amount, to ensure completeness of the desired hydrosilation reaction, given that some of the polyether may enter into other competitive reactions rather than the hydrosilation of the unsatuated group of the oxyalkylene polyether.

The hydrosilation should be run at 35 to 120 deg C., with the most favorable range being 60 to 110 degree C. A blanket of inert gas is desirable, though not absolutely necessarily, for running the reaction.

Experimental Section

Hydrosilation Procedure

Each hydrosilation was performed in a 4-neck round bottom flask of volume appropriate for the total quantity of the reagents to be used. The flask was fitted with a mechanical stirrer, Friedrich condenser, temperature-controlled heating mantle, thermocouple and sparge tube connected to a nitrogen source. Typically, weighed quantities of a silanic fluid, polyether and amine were added to the flask and the mixture was stirred while being heated to 65–90° C. The reaction was catalyzed with 0.03–0.25 ml of 10 mg/ml platinum solution of hexachloroplatinic acid (CPA) in ethanol. A temperature increase indicative of the exothermicity of the hydrosilation was observed after some time, and the reaction mixture cleared to a very pale yellow color. Completeness of the hydrosilation was determined by the test for SiH functional groups. The volume of hydrogen gas produced when a known weight of the reaction mixture was treated with alcoholic potassium hydroxide was measured as described in A. L. Smith (Editor), *Analysis of Silicones,* John Wiley and Sons, New York 1974, pp 145–149. Reactions that utilized toluene solvent were treated for acetal removal, whereby 1.25 wt % of 1.0N hydrochloric acid was added followed by neutralization with excess sodium bicarbonate and filtration, prior to recovery of the copolymer.

Test Procedures

The following test procedures were utilized in the evaluation of the copolymers produced in the following examples.

Cloud Point

Cloud point is the measurement of water solubility and as used herein, is the temperature at which a siloxane-oxyalkylene copolymer, for example, begins to precipitate out of a 1% aqueous solution. High cloud points are indicative of good water solubility. Cloud points were determined as follows: A 1 gram sample of the copolymer was placed in a 150 ml beaker and dissolved in 99 grams of distilled water. A 1-inch TEFLON® coated magnetic stirring bar was placed in the beaker, which was placed on a combination stirrer/hot plate. A thermometer was suspended in the solution, with the bulb approximately half an inch (1.27 cm) above the bottom of the beaker. The contents of the beaker were heated at approximately 2 degrees Celsius per minute, while being stirred. The temperature at which the bulb of the thermometer was no longer visible, due to the opacity of the solution, was recorded as the cloud point.

Color

The color of the copolymer was compared to varnish color disk 620C-40 in a Hollge Daylight Comparator. The closest matched color was recorded in GVS.

Viscosity

Viscosity was determined at 25° C. using a calibrated Oswald viscometer, which gives an efflux time of approximately 100 seconds. The resulting viscosity is derived from the product of the efflux time in seconds and the specific calibration factor of the viscometer.

Water Solubility

Hach Number

Hach number is a measurement of the water solubility and is herein as a measurement of the clarity of a 5% aqueous solution of the copolymer. For purpose of solubility, the lower the hach number the greater the solubility of the copolymer. The clarity or haze is measured in hach number and was determined by the use of a HACH Turbidimeter, model 2100A, and is reported in Nephelometric Turbidity Units (NTU). Hach numbers less than 20 NTU denote a clear solution.

EXAMPLES

Examples 1–4 are comparative examples in which toluene, a known hydrosilation reaction solvent currently used in the preparation of Copolymers, was employed. Examples 5–8 demonstrate solventless preparation of Copolymers in which the acid salt, sodium propionate, is employed as a buffer-catalyst modifier. Examples 9–41 demonstrate the utilization of amines as buffer-catalyst modifiers in the preparation of Copolymers both in the presence and more so the absence of a solvent. Examples 9 to 26 and 31 to 37 utilized the 3° amines, Examples 27 to 30 used the secondary amines, and Examples 31 to 34 used primary amines. Examples 37, 38, 40 and 41 represent the use of the present invention to prepare commercial scale quantities of copolymers. Examples 39 and 40 represent preparations of copolymers in reaction IPA solvent. Examples 42, 43 and 44 represents preparations of copolymers utilizing pre-formed complexes of platinum and amines of the present invention.

Glossary

APEG-350: Allylpolyethylene Oxide (350 Mol. Wgt.)
APEG-550: Allylpolyethylene Oxide (550 Mol. Wgt.)
BA: 1-Butanol-2-amine CPA: Chloroplatinic Acid ($H_2PtCl_6.6H_2O$)
D: $(CH_3)_2SiO$
D': $(CH_3)$ HSiO
DEAA: (N,N-Diethylamino)acetone
DEAEVE: (N,N-Diethylamino)ethanol vinyl ether
DEA3B: (N,N-Diethylamino)-3-butanone
5DEAP: 5-(N,N-Diethylamino)-2-pentanol
DEAP (N,N-Diethylamino)-2-propanol
DMAE: 2-(N,N-Dimethylamino)ethanol
DMAP: (N,N-Dimethylamino)-2-propanol
EA: Ethanolamine
GPC: Gel Permeation Chromatography
GVS: Gardener Varnish Standard
IPA: 2-Propanol
MAE: 2-(N-Methylamino)ethanol
M3DMA: Methyl 3-(N,N-dimethylamino)propionate
PA: 2-Propanolamine
PAE: 2-(N-Propylamino)ethanol
NTU: Nephelometric Turbidity Units
Unless indicated otherwise, all weights are in grams, except examples 37, 38, 40 and 41, where # is present, which represents weight in pounds.

Example 1 (Comparative Example)

A well stirred mixture of 100.1 grams of an olefinically substituted polyoxyalkylene having the average formula $CH_2=CHCH_2(OCH_2CH_2)_{7.5}OH$, 50.1 grams of an organohydrogenpolysiloxane of average formula $(CH_3)_3SiO[(CH_3)_2SiO]_{15}\{CH_3SiO(H)\}_6OSi(CH_3)_3$, and 45.0 grams of toluene were heated to 85° C. A solution of $H_2PtCl_6.6H_2O$ in ethanol was added to the mixture in sufficient amount to provide 7 ppm platinum. The heat source was removed and the exothermic hydrosilation was allowed to proceed until no further increase was noted. Following tests for SiH functionality, acetal treatment at 90° C. for thirty minutes and sodium bicarbonate neutralization/filtration was effected. The toluene and water were stripped to give a clear product, with a color of 1 GVS, 520 centistokes viscosity, solubility Hach of 4.8 NTU and a cloud point of 54° C.

Example 3 (Comparative Example)

A well stirred mixture of 110.1 grams of an olefinically substituted polyoxyalkylene having the average formula $CH_2=CHCH_2(OCH_2CH_2)_{14}OH$, 40.1 grams of an organohydrogenpolysiloxane of average formula $(CH_3)_3SiO[(CH_3)_2SiO]_{15}\{CH_3SiO(H)\}_6OSi(CH_3)_3$, and 45.0 grams of toluene were heated to 85° C. A solution of $H_2PtCl_6.6H_2O$ in ethanol was added to the mixture in sufficient amount to provide 7 ppm platinum. The heat source was removed and the exothermic hydrosilation was allowed to proceed until no further increase was noted. Following tests for SiH functionality, acetal treatment at 90° C. for thirty minutes and sodium bicarbonate neutralization/filtration was effected. The toluene and water were stripped to give a clear product, with a color of 2 GVS, 659 centistokes viscosity, solubility Hach of 2.5 NTU and a cloud point of 92° C.

Examples 2 and 4

The same procedure as example I was repeated for the other comparative examples 2 and 4, which were also prepared in toluene solvent. The results can be found tin Tables A and B.

Examples 5–8 (Comparative Example)

A well stirred mixture of 100. 1 grams of an olefinically substituted polyoxyalkylene having the average formula $CH_2=CHCH_2(OCH_2CH_2)_{7.5}OH$, 50.1 grams of an organohydrogenpolysiloxane of average formula $(CH_3)_3SiO[(CH_3)_2SiO]_{15}1CH_3SiO(H)1_6OSi(CH_3)_3$, and 0.06 grams of sodium propionate, were heated to 85° C. A solution of $H_2PtCl_6.6H_2O$ in ethanol was added to the mixture in sufficient amount to provide 7 ppm platinum. The heat source was removed and the exothermic hydrosilation was allowed to proceed until no further increase was noted. Following tests for SiH functionality, the product was stripped and filtered to give a clear product, with a color of 2 GVS, 557 centistokes viscosity, solubility Hach of 48.6 NTU and a cloud point of 47° C. The same procedure as example 5 was repeated for comparative examples 6, 7 and 8, which also utilized sodium propionate during the copolymer synthesis. The results can be found in Tables A and B.

Example 10–38

A well stirred mixture of 107.6 grams of an olefinically substituted polyoxyalkylene having the average formula $CH_2=CHCH_2(OCH_2CH_2)_{14}OH$, 37.4 grams of an organohydrogenpolysiloxane of average formula $(CH_3)_3SiO[(CH_3)_2SiO]_{15}\{CH_3SiO(H)\}_6OSi(CH_3)_3$, and 0.05 grams N,N-dimethylamino-2-propanol were heated to 85° C. A solution of $H_2PtCl_6.6H20$ in ethanol was added to the mixture in sufficient amount to provide 7.5 ppm platinum. The heat source was removed and the exothermic hydrosilation was allowed to proceed until no further increase was noted. Following tests for SiH functionality, the product was subsequently stripped to give a clear product, with a color of 1 GVS, 583 centistokes viscosity, 2.3 NTU solubility hach and a cloud point of 97° C.

The same procedure as example 9 was repeated for examples 10 through 38, which represent examples of the invention. The results can be found in Tables A and B.

Example 39

A well stirred mixture of 181.0 grams of an olefinically substituted polyoxyalkylene having the average formula $CH_2=CHCH_2(OCH_2CH_2)_{7.5}OH$, 99.0 grams of an organohydrogenpolysiloxane of average formula $(CH_3)_3SiO[(CH_3)_2SiO]_{15}\{CH_3SiO(H)\}_6OSi(CH_3)_3$, 69.9 grams of 2-propanol and 0.04 grams of N,N-dimethyamino-2-propanol, were heated to 85° C. A solution of $H_2PtCl_6.6H_2O$ in ethanol was added to the mixture in sufficient amount to provide 5 ppm Platinum. The heat source was removed and the exothermic hydrosilation was allowed to proceed until no further increase was noted. Following tests for SiH functionality, the product was stripped to give a clear product, with a color of 1 GVS, 330 centistokes viscosity, solubility Hach of 17.3 NTU and cloud point of 53° C.

Example 40

A well stirred mixture of 1630 pounds of an olefinically substituted polyoxyalkylene having the average formula $CH_2=CHCH_2(OCH_2CH_2)_{14}OH$, 685 pounds of an organohydrogenpolysiloxane of average formula $(CH_3)_3SiO[(CH_3)_2SiO]_{13}\{CH_3SiO(H)\}_6OSi(CH_3)_3$, and 1.15 pounds of N,N-(dimethylamino)-2-propanol and 552 pounds of 2-propanol were heated to 85° C. A solution of $H_2PtCl_6.6H_2O$ in ethanol was added to the mixture in sufficient amount to provide 5 ppm Platinum. The heat source was removed and the exothermic hydrosilation was allowed to proceed until no further increase was noted. Following tests for SiH functionality, the product was stripped to give a clear product, with a color of 1 GVS, 591 centistokes viscosity and 92° C. cloud point.

Example 41

A well stirred mixture of 1702 pounds of an olefinically substituted polyoxyalkylene having the average formula $CH_2=CHCH_2(OCH_2CH_2)_{14}OH$, 649 pounds of an organohydrogenpolysiloxane of average formula $(CH_3)_3SiO[(CH_3)_2SiO]_{15}\{CH_3SiO(H)\}_6OSi(CH_3)_3$, and 1.2 pounds N,N-dimethylamino-2-propanol, were heated to 85° C. A solution of $H_2PtCl_6.6H_2O$ in ethanol was added to the mixture in sufficient amount to provide 5 ppm platinum. The heat source was removed and the exothermic hydrosilation was allowed to proceed until no further increase was noted. Following tests for SiH functionality, the product was stripped and filtered to give a clear product, with a color of 1 GVS, 541 centistokes viscosity, solubility Hach of 2.3 NTU and cloud point of 96° C.

Example 42

A pre-formed complex of the noble metal catalyst and an amine of the invention were prepared in accordance with U.S. Pat. No. 4,292,434. 11.0 parts $H_2PtCl_6.6H_2O$ was dissolved in 100 parts of 2-propanol followed by slow addition of 24.8 parts N,N-dimethylamino-2-propanol. The resulting mixture was held at 50° C. for two hours, then cooled, filtered and stripped under reduced pressure to give a yellowish red solid. The solids were purified by dissolving in hot ethanol followed by crystallization with the aid of toluene. The crystals obtained were vacuum dried for several hours to give red solids. 1.0 gram of the solid was dissolved in 25 cc of ethanol, which produced a solution containing 0.87% platinum. An aliquot of this solution was utilized as the hydrosilation catalyst below. A well stirred mixture of 93.8 grams of an olefinically substituted polyoxyalkylene having the average formula $CH_2=CHCH_2(OCH_2CH_2)_{7.5}OH$, 51.3 grams of an organohydrogenpolysiloxane of average formula $(CH_3)_3SiO[(CH_3)_2SiO]_{15}\{CH_3SiO(H)\}_6OSi(CH_3)_3$ was heated to 85° C. A solution of the above platinum-amine complex was added to the mixture in sufficient amount to provide 5 ppm Platinum. The heat source was removed and the exothermic hydrosilation was allowed to proceed until no further increase was noted. Following tests for SiH functionality, the product was stripped to give a clear product, with a color of 1 GVS, 453 centistokes viscosity, pH of 7.3, solubility Hach of 6.2 NTU and cloud point of 52° C.

The same procedure as example 42 was repeated for examples 43 and 44, using (N,N-diethylamino)-2-propanol and 3-(N,N-dimethylamino)-1-propanol, respectively as the amines. A sample of the solids was recovered in each case and separate solutions of each in ethanol were made and utilized as the hydrosilation catalysts. The physical properties of which are listed in Table 11.

TABLE A

MD13D'6M + APEG-350(mw) with several Amines

| Ex. | SiH Fld | APEG (g) | Buffer | Buffer Mass | Pt (ppm) | Process Time (min) | Visc (cSt) | Cld Pt (C.) | Color (GVS) | Sol. Hach (NTU) |
|---|---|---|---|---|---|---|---|---|---|---|
| 2e | 50.1 | 100.1 | — | — | 7.5 | 180 | 483 | 55 | 1 | 4.7 |
| 6* | 50.1 | 100.1 | Sod. Prop. | 0.06 | 7.5 | 110 | 530 | 48 | 2 | 53.6 |
| 11 | 106.1 | 194.0 | DMAP | 0.2 | 5 | 44 | 354 | 54 | 2 | 6.9 |
| 12 | 2724.3 | 4987.5 | DMAP | 2.5 | 5 | 120 | 379 | 52 | 1 | 5.9 |
| 14 | 49.3 | 96.5 | DEAP | 0.02 | 6 | 38 | 359 | 51 | 1 | 10 |
| 16 | 49.3 | 96.7 | DEA3B | 0.03 | 5 | 51 | 329 | 51 | 1 | 8.3 |
| 18 | 49.3 | 96.7 | DEAEVE | 0.03 | 5 | 45 | 267 | 51 | 1 | 10.8 |
| 19 | 49.3 | 96.7 | M3DMA | 0.02 | 5 | 45 | 315 | 50 | 1 | 9.8 |
| 22 | 70.4 | 129.6 | DEAP | 0.03 | 6 | 40 | 336 | 50 | 1 | 17.1 |
| 23 | 70.4 | 129.6 | DEAA | 0.03 | 6 | 51 | 417 | 49 | 1 | 7.2 |
| 25 | 70.4 | 129.6 | DMA | 0.03 | 6 | 48 | 359 | 49 | 1 | 13.4 |
| 28 | 51.3 | 93.8 | MAE | 0.06 | 6 | 90 | 372 | 52 | 1 | 8.2 |
| 30 | 70.4 | 129.6 | PAE | 0.03 | 6 | 55 | 411 | 49 | 1 | 7.2 |
| 31 | 51.4 | 96.8 | PA | 0.06 | 6 | 45 | 535 | 45 | 1 | 42.5 |
| 33 | 51.4 | 96.8 | BA | 0.06 | 6 | 40 | 510 | 45 | 1 | 40.5 |
| 34 | 51.4 | 96.8 | EA | 0.06 | 6 | 85 | 490 | 44 | 1 | 40.6 |
| 35 | 74.3 | 65.8 | DMAP | 0.04 | 6 | 53 | 289 | — | 1 | — |
| 36 | 74.3 | 65.8 | DMAP | 0.07 | 7.5 | 57 | 278 | — | 1 | — |
| 37 | 8765# | 10235# | DMAP | 5.0# | 5 | — | 336 | — | 1 | — |
| 38 | 847# | 1453# | DMAP | 1.2# | 3 | — | 476 | 52 | 1 | 7.8 |

TABLE B

MD13D'6M + APEG-550(mw) with several Amines

| Ex. No. | SiH Fld. (g) | APEG (g) | Amine and Mass Thereof (gm) | | Platinum (ppm) | Time of Process (Min) | Visc. (cSt) | Cld. Pt (° C.) | Color (GVS) | Sol. Hach (NTU) |
|---|---|---|---|---|---|---|---|---|---|---|
| 3є | 40.1 | 110.1 | — | — | 7.5 | 175 | 659 | 92 | 2 | 2.5 |
| 4є | 40.1 | 110.1 | — | — | 7.5 | 170 | 535 | 96 | 2 | 2.4 |
| 7* | 40.6 | 110.8 | Sod. | 0.06 | 7.5 | 120 | 638 | 82 | 2 | 20.3 |
| 8* | 40.3 | 110.5 | Sod. | 0.06 | 7.5 | 125 | 727 | 78 | 2 | 30.3 |
| 9 | 37.4 | 107.6 | DMAP | 0.05 | 5 | 43 | 583 | 97 | 1 | 2.5 |
| 10 | 38.7 | 111.2 | DMAP | 0.11 | 5 | 57 | 541 | 94 | 1 | 2.4 |
| 13 | 39.8 | 110.2 | DEAP | 0.02 | 6 | 41 | 879 | 95 | 1 | 3.6 |
| 15 | 39.8 | 110.2 | DEA3B | 0.02 | 6 | 48 | 653 | 95 | 1 | 2.3 |
| 17 | 39.8 | 110.2 | DEAEVE | 0.02 | 6 | 55 | 582 | 95 | 1 | 2.2 |
| 20 | 39.8 | 110.2 | M3DMA | 0.02 | 6 | 60 | 822 | 94 | 1 | 2.1 |
| 21 | 39.8 | 110.2 | DEAP | 0.02 | 6 | 49 | 586 | 94 | 1 | 2.2 |
| 24 | 39.8 | 110.2 | DEAA | 0.03 | 6 | 65 | 865 | 94 | 1 | 2.4 |
| 26 | 39.8 | 110.6 | DMEA | 0.02 | 6 | 58 | 569 | 90 | 1 | 2.3 |
| 29 | 39.8 | 110.6 | PAE | 0.02 | 6 | 70 | 767 | 94 | 1 | 2.3 |
| 40 | 605# | 1630# | DMAP | 1.2# | 5 | — | 591 | 92 | 1 | 2.3 |
| 41 | 649# | 1792# | DMAP | 0.9# | 5 | — | 541 | 96 | 1 | 2.3 |

єToluene controls
*Sodium propionate Comparatives

TABLE 1

$MD_{13}D'_6M$ + APEG (350 mw); 1° amines & Comparative Examples

| EXP | BUFFER/ CATALYST MODIFIER | TOLUENE REACTION SOLVENT % | COLOR (GVS) | VISC. (cSt) | CLOUD POINT (° C.) | SOL. HACH (NTU) |
|---|---|---|---|---|---|---|
| 1 | NONE | 30 | 1 | 520 | 52 | 4.8 (clear) |
| 2 | NONE | 30 | 1 | 483 | 53 | 4.7 (clear) |
| 5 | Sodium Propionate | | 2 | 557 | 47 | 48.6 (cloudy) |
| 6 | Sodium Propionate | 0 | 2 | 530 | 48 | 53.6 (cloudy) |
| 31 | 1-Amino-2-propanol | 0 | 1 | 535 | 49 | 42.5 (cloudy) |
| 32 | 1-Amino-2-propanol | 0 | 1 | 520 | 49 | 40.5 (cloudy) |
| 33 | 2-Amino-1-butanol | 0 | 1 | 510 | 49 | 40.6 (cloudy) |
| 34 | Ethanolamine | 0 | 1 | 490 | 48 | 54.8 (cloudy) |

In Table 1, Examples 1 and 2 are controls, which demonstrate preparation of copolymers in toluene solvent. Examples 5 and 6 represent solventless copolymer preparations utilizing sodium propionate as the buffer-catalyst modifier. While for the controls, the cloud points were 52° and 53° C., those of the sodium propionate buffered copolymers were up to 5° C. less, indicating lower solubility. This trend again is evident when the Hach numbers are compared. The controls gave hach numbers less than 5, representing clear solution, while hach numbers greater than 40 (cloudy solution) were obtained for samples 5 and 6. Again the same trend as that for sodium propionate was displayed by Copolymer made with a primary amine. While the latter was comparable to the performance of sodium propionate, it was not as good as the solvent-made material.

TABLE 2

$MD_{13}D'_6M$ + APEG (350 mw); 2° amines & Comparative Examples

| EXP | BUFFER/ CATALYST MODIFIER | TOLUENE REACTION SOLVENT % | COLOR (GVS) | VISC. (cSt) | CLOUD POINT (° C.) | SOL. HACH (NTU) |
|---|---|---|---|---|---|---|
| 1 | NONE | 30 | 1 | 520 | 52 | 4.8 (clear) |
| 2 | NONE | 30 | 1 | 483 | 53 | 4.7 (clear) |
| 5 | Sodium Propionate | 0 | 2 | 557 | 47 | 48.6 (cloudy) |
| 6 | Sodium Propionate | 0 | 2 | 530 | 48 | 53.6 (cloudy) |
| 28 | (2-Methylamino) ethanol | 0 | 1 | 372 | 52 | 8.2 (clear) |
| 30 | (2-Propylamino) ethanol | 0 | 1 | 411 | 49 | 7.2 (clear) |

TABLE 3

$MD_{13}D'_6M$ + APEG (550 mw): 2° 0 amines & Comparative Examples

| EXP | BUFFER/ CATALYST MODIFIER | TOLUENE REACTION SOLVENT % | COLOR (GVS) | VISC. (cSt) | CLOUD POINT (° C.) | SOL. HACH (NTU) |
|---|---|---|---|---|---|---|
| 3 | NONE | 30 | 1 | 659 | 92 | 2.5 (clear) |
| 4 | NONE | 30 | 1 | 535 | 96 | 2.4 (clear) |
| 7 | Sodium Propionate | 0 | 2 | 666 | 82 | 30.6 (cloudy) |
| 8 | Sodium Propionate | 0 | 2 | 530 | 78 | 40.7 (cloudy) |
| 27 | (2-Methylamino) ethanol | 0 | 1 | 650 | 94 | 2.4 (clear) |
| 29 | (2-Propylamino) ethanol | 0 | 1 | 767 | 94 | 2.3 (cloudy) |

In Tables 2 and 3, examples 1, 2, 3 and 4 represent the control, while examples 5 through 8 represent sodium propionate. Once again the trend towards lower cloud points (Table 2: 48° C. vs 53° C. Table 3: 80° C. vs 94° C.) and solubility (Table 2 : avg. of 51 NTU (cloudy) vs 4.8 NTU; Table 3: avg. of 35 NTU{cloudy} vs 2.4 NTU[clear] is exhibited by copolymers from sodium propionate processes. Secondary amines, on the other hand show remarkably similar results as the controls. The average cloud points differ by only a small margin (Table 2: 50.5 vs 53.5 ; Table 3: 94 vs 94). The average solubility hach numbers were virtually identical (Table 3: 2.4 vs 2.5). While the average hach numbers were somewhat different for Table 2 (7.7 vs 4.8), clear solutions were obtained from Copolymers made with these secondary amines.

TABLE 4

$MD_{13}D'_6M$ + APEG (350 mw); 3° amines (Hydroxyl Derivative) & Comparative Examples

| EXP | BUFFER/ CATALYST MODIFIER | TOLUENE REACTION SOLVENT % | COLOR (GVS) | VISC. (cSt) | CLOUD POINT (° C.) | SOL. HACH. (NTU) |
|---|---|---|---|---|---|---|
| 1 | NONE | 30 | 1 | 520 | 52 | 4.8 (clear) |
| 2 | NONE | 30 | 1 | 483 | 53 | 4.7 (clear) |
| 5 | Sodium Propionate | 0 | 2 | 557 | 47 | 48.6 (cloudy) |
| 6 | Sodium Propionate | 0 | 2 | 530 | 48 | 53.6 (cloudy) |
| 11 | DMAP | 0 | 2 | 359 | 54 | 6.9 (clear) |
| 12 | DMAP | 0 | 1 | 379 | 52 | 6.5 (clear) |
| 14 | DEAP | 0 | 1 | 359 | 51 | 10 (clear) |
| 22 | 5DEAP | 0 | 1 | 336 | 50 | 17.1 (clear) |
| 25 | DMAE | 0 | 1 | 359 | 49 | 13.4 (clear) |
| 39 | DMAP | 20 (IPA) | 1 | 330 | 53 | 17.3 (clear) |

Examples 1 and 2 of Table 4 represent the controls, examples 5 and 6, sodium propionate generated copolymers. The established trend towards the lowering of cloud points and hach numbers already seen in the data of Tables 1 through 3, for sodium propionate generated copolymers, is reproduced here in Table 4. Like the data in Tables 2 and 3 for secondary amines, the results for these solventless, tertiary amine generated copolymers, (N,N-Dimethylamino)-2-propanol (DMAP) in particular, almost duplicate those of the control. The average cloud point for DMAP generated copolymer was 53° C. vs 53.5° C. for the control. The average hach number was 6.7 vs 4.7, both representing very clear solutions. The average viscosity for DMAP copolymers was (desirably) 132 cSt less than that of the control (369 vs 501). The other tertiary amines generated copolymers of Table 4 show cloud points that are relatively close to the that of the controls, in addition to producing clear aqueous solutions. The overall data of Table 4, confirms the equivalency of cloud points and aqueous solubility generated by Copolymers made solventless buffered by tertiary amines and Copolymers made in toluene solvent.

The general trend established in Table 4 is again confirmed by the data in table 5. Namely that sodium propionate buffered copolymers gave lower cloud point and higher hach numbers than the control, hence lower aqueous solubility than the controls. Contrarily, cloud points and hach numbers were comparable to those of the control, for Copolymers which were made solventless and buffered by tertiary amines.

Here the polyether, allyloxypolyethyleneglycol [APEG:550 (mw)] used in the synthesis of the Copolymers had a much higher molecular weight and ethylene oxide content than that utilized in the synthesis of the copolymers in Table 4 [APEG: 390 (mw)]. Consequently the cloud points are much higher for the controls (94° C.). The corresponding cloud points were 93.5° C., (ave., eg 9 & 40), 95° C. (eg 13), 94° C.: eg. 21 and 90° C. (eg 26) for DMAP, DEAP, 5DEAP and DMAE, respectively. Only for (N,N-dimethylamino)ethanol (DMAE) was the cloud point less than the control. The corresponding hach numbers were virtually the same as the control (2.2 to 4.5 vs 2.5), representing very clear solutions.

TABLE 5

$MD_{13}D'_6M$ + APEG (550 mw); 3° (Hydroxyl Derivative) amines & Comparative Examples

| EXP | BUFFER/ CATALYST MODIFIER | TOLUENE REACTION SOLVENT % | COLOR (GVS) | VISC. (cSt) | CLOUD POINT (° C.) | SOL. HACH (NTU) |
|---|---|---|---|---|---|---|
| 3 | NONE | 30 | 2 | 659 | 92 | 2.5 (clear) |
| 4 | NONE | 30 | 2 | 535 | 96 | 2.4 (clear) |
| 7 | Sodium Propionate | 0 | 2 | 666 | 82 | 30.6 (cloudy) |
| 8 | Sodium Propionate | 0 | 2 | 727 | 78 | 40.8 (cloudy) |
| 9 | DMAP | 0 | 1 | 583 | 97 | 2.5 (clear) |
| 40 | DMAP | 20 | 1 | 591 | 92 | 4.5 (clear) |
| 13 | DEAP | 0 | 1 | 879 | 95 | 3.6 (clear) |
| 21 | 5DEAP | 0 | 1 | 586 | 94 | 2.2 (clear) |
| 26 | DMAE | 0 | 1 | 569 | 90 | 2.3 (clear) |

TABLE 6

$MD_{13}D'_6M$ + APEG (350 mw); 3° amines (Keto derivatives) & Comparative Examples

| EXP | BUFFER/ CATALYST MODIFIER | TOLUENE REACTION SOLVENT % | COLOR (GVS) | VISC. (cSt) | CLOUD POINT (° C.) | SOL. HACH (NTU) |
|---|---|---|---|---|---|---|
| 1 | NONE | 30 | 1 | 520 | 52 | 4.8 (clear) |
| 2 | NONE | 30 | 1 | 483 | 53 | 4.7 (cloudy) |
| 5 | Sodium Propionate | 0 | 2 | 557 | 47 | 48.6 (cloudy) |
| 6 | Sodium Propionate | 0 | 2 | 530 | 48 | 53.6 (cloudy) |
| 16 | DEA3B | 0 | 1 | 329 | 51 | 8.3 (clear) |
| 23 | (N,N-Diethylamino)acetone | 0 | 1 | 417 | 49 | 7.2 (clear) |

TABLE 7

$MD_{13}D'_6M$ + APEG (550 mw); 3° amines (Keto Derivative) & Comparative Examples

| EXP | BUFFER/ CATALYST MODIFIER | TOLUENE REACTION SOLVENT % | COLOR (GVS) | VISC. (cSt) | CLOUD POINT (° C.) | SOL. HACH (NTU) |
|---|---|---|---|---|---|---|
| 3 | NONE | 30 | 2 | 659 | 92 | 2.5 (clear) |
| 4 | NONE | 30 | 2 | 535 | 96 | 2.4 (clear) |
| 7 | Sodium Propionate | 0 | 2 | 666 | 82 | 20.3 (cloudy) |
| 8 | Sodium Propionate | 0 | 2 | 727 | 78 | 30.3 (cloudy) |
| 15 | DEA3B | 0 | 1 | 653 | 95 | 2.3 (clear) |
| 24 | (N,N-Diethyl-amino)acetone | 0 | 1 | 865 | 94 | 2.4 (clear) |

Tables 6 and 7 contain data for the controls (e.g., 4, 3, 2 and 1), comparative examples for sodium propionate (eg. 8,7,6 & 5) and tertiary amines of the invention, that possess keto functionality in their structure. The amines produced Copolymers that had comparable cloud points (51 & 49 vs 53.5° C. and 95 & 94 vs 94 C) and hach numbers (8.3 & 7.2 vs 4.8 and 2.3 & 2.4 vs 2.5) as the controls. Table 8 depicts data for the controls (3 & 4), sodium propionate (7 & 8) and two tertiary amines of the invention, which contain ether and ester functionalites in their structures. The corresponding cloud points (95 & 94 vs 94° C.) and hach numbers (2.2 & 2.3 vs 2.4) were as good as or better than those of the control.

TABLE 8

$MD_{13}D'_6M$ + APEG-550; 3° Amines (Ether and Ester Derivatives) & Comparative Examples

| EXP | BUFFER/ CATALYST MODIFIER | TOLUENE REACTION SOLVENT % | COLOR (GVS) | VISC. (cSt) | CLOUD POINT (° C.) | SOL. HACH (NTU) |
|---|---|---|---|---|---|---|
| 3 | NONE | 30 | 2 | 659 | 92 | 2.5 (clear) |
| 4 | NONE | 30 | 2 | 535 | 96 | 2.4 (clear) |
| 7 | Sodium Propionate | 0 | 2 | 666 | 82 | 20.3 (cloudy) |
| 8 | Sodium Propionate | 0 | 2 | 727 | 78 | 30.3 (cloudy) |
| 17 | DEAEVE | 0 | 1 | 582 | 95 | 2.2 (clear) |
| 20 | D3DMA | 0 | 1 | 822 | 94 | 2.3 (clear) |

TABLE 9

$MD_{13}D'_6M$ + APEG (550 mw); 3° amines: Large Scale Preparations & Comparative Examples

| EXP | BUFFER/ CATALYST MODIFIER | TOLUENE REACTION SOLVENT % | COLOR (GVS) | VISC. (cSt) | CLOUD POINT (° C.) | SOL. HACH (NTU) |
|---|---|---|---|---|---|---|
| 3 | NONE | 30 | 2 | 659 | 92 | 2.5 (clear) |
| 4 | NONE | 30 | 2 | 535 | 96 | 2.4 (clear) |
| 7 | Sodium Propionate | 0 | 2 | 666 | 82 | 20.3 (cloudy) |
| 8 | Sodium Propionate | 0 | 2 | 727 | 48 | 30.3 (cloudy) |
| 40 | DMAP | 20 | 1 | 591 | 92 | 3.6 (clear) |
| 41 | DMAP | 0 | 1 | 541 | 96 | 2.3 (clear) |

TABLE 10

$MD_{13}D'_6M$ + APEG (350 mw); 3° amines: Large Scale Preparations & Comparative Examples

| EXP | BUFFER/ CATALYST MODIFIER | TOLUENE REACTION SOLVENT % | COLOR (GVS) | VISC. (cSt) | CLOUD POINT (° C.) | SOL. HACH (NTU) Wt % |
|---|---|---|---|---|---|---|
| 1 | NONE | 30 | 1 | 520 | 52 | 4.8 (clear) |
| 2 | NONE | 30 | 1 | 483 | 53 | 4.7 (clear) |
| 5 | Sodium Propionate | 0 | 2 | 557 | 47 | 48.6 (cloudy) |
| 6 | Sodium Propionate | 0 | 2 | 530 | 48 | 53.6 (cloudy) |
| 37ω | DMAP | 0 | 1 | 336 | — | — |
| 38 | DMAP | 0 | 1 | 476 | 52 | 7.8 (clear) |

ωReaction product of $MD_{20}D'_3M$ and APEG-350

Tables 9 and 10 contain controls (4, 3, 2 & 1), sodium propionate comparative examples (8, 7, 6 & 5) and large-scale preparations (41, 40, 38 & 37) utilizing the amine (N,N-dimethylamino)-2-propanol. Once more, the cloud points and hach numbers exhibited by these large-scale copolymer preparations, were equivalent to those of the controls. Examples 39 and 40 of Table 9 represent the preparations of copolymers of this invention in 2-propanol solvent. The resulting cloud point was identical (92 vs 92° C.) to that of the control, while the solubility hach number, was only slightly different (3.6 vs 2.5) from the control.

TABLE 11

MD$_{13}$D'$_6$M + APEG (350 mw); Pre-formed Pt-Amine Complex & Comparative Examples

| EXP | BUFFER/ CATALYST MODIFIER | TOLUENE REACTION SOLVENT % | COLOR (GVS) | VISC. (cSt) | CLOUD POINT (° C.) | SOL. HACH (NTU) |
|---|---|---|---|---|---|---|
| 3 | NONE | 30 | 1 | 520 | 52 | 4.8 (clear) |
| 4 | NONE | 30 | 1 | 483 | 53 | 4.7 (clear) |
| 7 | Sodium Propionate | 0 | 2 | 557 | 47 | 53.6 (cloudy) |
| 8 | Sodium Propionate | 0 | 2 | 530 | 48 | 42.5 (cloudy) |
| 42 | Complex 1 | 0 | 1 | 453 | 53 | 5.7 (clear) |
| 43 | Complex 2 | 0 | 1 | 430 | 53 | 7.4 (clear) |
| 44 | Complex 3 | 0 | 1 | 470 | 52 | 6.2 (clear) |

Complex 1: N,N-(dimethylamino)-2-propanol derivative
Complex 2: N,N-(diethylamino)-2-propanol derivative
Complex 3: 3-(N,N-dimethylamino)-1-propanol derivative A comparison of the data in Table 11 shows that the Copolymers prepared solventless, utilizing the pre-formed platinum-amine complexes (42, 43 & 44), exhibit comparable characteristics as those of the control. The cloud points were equal or slightly higher than the control (53° C. vs 53° C.). The hach numbers, though slightly higher than the control (5.7–7.4 vs 4.8), represent very clear solutions. Their viscosities were on average, 40 centistokes lower than the control, which may indicate a greater effect against side reactions.

TABLE C

GPC Data of Copolymers from MD$_{13}$D'$_6$M and APEG-350 (mw)

| Sample | Buffer/ Catalyst Modifier | NAMW Mn | WAMW Mw | Polydispers. Mw/Mn | Change in Mw/Mn vs Std. |
|---|---|---|---|---|---|
| A | None/std | 20,360 | 1,720 | 11.84 | — |
| B | DMAP | 13,480 | 2,060 | 6.54 | −44.7% |
| C | DMAP/IPA | 7,660 | 1,560 | 4.91 | −58.6% |

TABLE D

GPC Data of Copolymers from MD$_{13}$D'$_6$M and APEG-550 (mw)

| Sample | Buffer/ Catalyst Modifier | NAMW Mn | WAMW Mw | Polydispers. Mw/Mn | Change in Mw/Mn vs Std |
|---|---|---|---|---|---|
| E | None/std | 11,890 | 780 | 15.24 | — |
| F | DMAP | 5,310 | 910 | 5.84 | −61.1% |
| G | DMAP/IPA | 5,650 | 980 | 5.77 | −62.2% |

A & E: Controls, made in toluene solvent
C & G: DMAP without solvent
B & F: DMAP in 2-propnol solvent The utilization of Copolymers in the textile industry is widely practiced. It is a known fact that these copolymers enhance the wettability of various fibers. When for instance, the control copolymer A of Table C was applied to nonwoven fibers, the wettability obtained was of the order of 2 on a scale of 1 to 5, where 1 and 5 represent relatively poor and very good wetting, respectively. The Copolymers B and D of this invention, gave wettabilities that were of the order of 4 and 4.5, indicating much improvement over the control.

One major desirable difference between Copolymers of the invention and those of the controls is in their respective polydispersity. As is evident in Table D, the polydispersity of the control, Copolymer E (15.2), is more than two and one half times that of Copolymers F (5.8) and G (5.8). The difference holds even where the Copolymer of the invention (G) was made in 2-propanol solvent. The same trend is again evident in Table C, where the polydispersity for the control (A) is close to twice those of Copolymers of the invention (F&G).

What is claimed is:

1. A process for preparing siloxane-oxyalkylene copolymers comprising the steps of:

reacting (i) an organohydrogen-polysiloxane having the average formula:

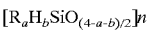

$$[R_aH_bSiO_{(4-a-b)/2}]n$$

wherein R denotes a monovalent hydrocarbon radical free of aliphatic unsaturation and has 1 to 8 carbon atoms, a has an average value of 1 to 3, b has an average value of 0.01 to 1.5, the sum of a+b has an average value of 1 to 3, and n denotes the number of siloxane units having a value of 2 to 200;

(ii) at least one polyoxyalkylene having the average formula:

$$R^1(OCH_2CH_2)_z(OCH_2[R^3]CH)_w\text{—ORW or}$$

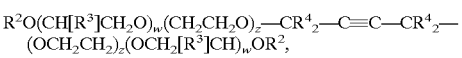

$$R^2O(CH[R^3]CH_2O)_w(CH_2CH_2O)_z\text{—}CR^4{}_2\text{—}C{\equiv}C\text{—}CR^4{}_2\text{—}\\(OCH_2CH_2)_z(OCH_2[R^3]CH)_wOR^2,$$

wherein $R^1$ denotes an unsaturated hydrocarbon group containing from 2 to 10 carbon atoms; $R^2$ is $R^1$, hydrogen an alkyl group containing 1 to 8 carbon atoms, an acyl group containing 2 to 8 carbon atoms, or a trialkylsilyl group; $R^3$ is a monovalent hydrocarbon group containing 1 to 18 carbon atoms; $R^4$ is $R^3$ or hydrogen; z has a value of 0 to 100; and w has a value of 0 to 80, in the presence of (iii) at least one amine having an alkyl group with hydroxyl, carbonyl, or ether functionality, which has a boiling point no higher than 220° C. at atmospheric pressure and (iv) a catalytically effective amount of a noble hydrosilation catalyst;

maintaining the temperature of the mixture to promote the reaction of the organohydrogen-polysiloxane with the polyoxyalkylene;

allowing the reaction to go to completion at a maintained temperature below 120° C.; and recovering the copolymer.

2. A process for preparing siloxane-oxyalkylene copolymers comprising the steps of:

reacting (i) an organohydrogen-polysiloxane and (ii) an unsaturated polyoxyalkylene, in the presence of (iii) an amine selected from the group consisting of N,N-dimethylamino-2-propanol, N,N-diethylamino-2-propanol, 5-N,N-diethylamino-2-pentanol, 2-(N,N-diethylamino)ethanol vinyl ether, methyl 3-(N,N-dimethylamino)propionate, (N,N-diethylamino)acetone, 2-(N-methylamino)ethanol, 2-(N-propylamino)ethanol, 1-amino-2-propanol, 2-aminobutanol, N,N-(diethylamino)acetone, (N,N-diethylamino-3-butanone and 3-(N,N-dimethylamino)-1-propanol; and (iv) a catalytically effective amount of a noble hydrosilation catalyst.

3. A process for preparing siloxane-oxyalkylene copolymers comprising reacting (i) an organohydrogen-polysiloxane and (ii) an unsaturated polyoxyalkylene, in the presence of (iii) an amine which has a boiling point no higher than 220° C. at atmospheric pressure and (iv) a catalytically effective amount of a noble hydrosilation catalyst wherein the amine and the noble hydrosilation catalyst are combined prior to addition to the organohydrogen-polysiloxane and the unsaturated polyoxyalkylene.

4. A process for preparing siloxane-oxyalkylene copolymers comprising reacting (i) an organohydrogen-polysiloxane and (ii) an unsaturated polyoxyalkylene, in the presence of (iii) N,N-(dimethylamino)-2-propanol and (iv) a catalytically effective amount of a chloroplatinic acid wherein the N,N-(dimethylamino)-2-propanol and the chloroplatinic acid are combined prior to addition to the organohydrogen-polysiloxane and the unsaturated polyoxyalkylene.

5. A process for preparing siloxane-oxyalkylene copolymers comprising reacting (i) an organohydrogen-polysiloxane and (ii) an unsaturated polyoxyalkylene, in the presence of (iii) an amine selected from the group consisting of N,N-(dimethylamino)-2-propanol; N,N-(diethylamino)-2-propanol; 3-(N,N-dimethylamino)-1-propanol, 5-(N,N-dimethylamino)-2-pentanol, 2-(N-methylamino) ethanol, 2-(N-propylamino)ehtanol, 1-amino-2-propanol and 2-aminobutanol, and (iv) a catalytically effective amount of a noble hydrosilation catalyst comprising a compound containing platinum, or (v) prereacted complex of the amine and the catalyst.

6. A process for preparing siloxane-oxyalkylene copolymers comprising reacting (i) an organohydrogen-polysiloxane and (ii) an unsaturated polyoxyalkylene, in the presence of (iii) an amine comprising 3-(N,N-dimethylamino)propionate, and (iv) a catalytically effective amount of a noble hydrosilation catalyst comprising a compound containing platinum, or (v) a pre-reacted complex of the amine and the catalyst.

7. A process for preparing siloxane-oxyalkylene copolymers comprising reacting (i) an organohydrogen-polysiloxane and (ii) an unsaturated polyoxyalkylene, in the presence of (iii) an amine selected from the group consisting of (N,N-dimethylamino)acetone, (N,N-diethylamino) acetone and (N,N-diethylamino)-3-butanone, and (iv) a catalytically effective amount of a noble hydrosilation catalyst comprising a compound containing platinum, or (v) a pre-reacted complex of the amine and the catalyst.

* * * * *